(12) United States Patent
Inaba et al.

(10) Patent No.: US 12,481,115 B2
(45) Date of Patent: Nov. 25, 2025

(54) OPTICAL DEVICE AND OPTICAL COMPONENT

(71) Applicant: FURUKAWA ELECTRIC CO., LTD., Tokyo (JP)

(72) Inventors: Yusuke Inaba, Tokyo (JP); Takuya Kokawa, Tokyo (JP); Kazuki Yamaoka, Tokyo (JP); Ryo Otsubo, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 659 days.

(21) Appl. No.: 17/816,579

(22) Filed: Aug. 1, 2022

(65) Prior Publication Data

US 2022/0365310 A1    Nov. 17, 2022

Related U.S. Application Data

(63) Continuation of application No. PCT/JP2021/002905, filed on Jan. 27, 2021.

(30) Foreign Application Priority Data

Feb. 3, 2020   (JP) ................................. 2020-016616

(51) Int. Cl.
*G02B 7/02*     (2021.01)
*G02B 17/00*    (2006.01)

(52) U.S. Cl.
CPC ........... *G02B 7/021* (2013.01); *G02B 17/004* (2013.01)

(58) Field of Classification Search
None
See application file for complete search history.

(56) References Cited

U.S. PATENT DOCUMENTS

| 7,687,997 B2 | 3/2010 | Gaertner et al. |
| 8,451,523 B2 * | 5/2013 | Mihara .................. G02B 26/12 |
| | | 359/215.1 |
| 2008/0049807 A1 | 2/2008 | Fujino |
| 2008/0061667 A1 | 3/2008 | Gaertner et al. |

FOREIGN PATENT DOCUMENTS

| CN | 101133475 A | 2/2008 |
| JP | 2001-54945 A | 2/2001 |
| JP | 2004-112480 A | 4/2004 |

(Continued)

OTHER PUBLICATIONS

International Search Report issued Apr. 20, 2021 in PCT/JP2021/002905, filed on Jan. 27, 2021, 4 pages.

(Continued)

*Primary Examiner* — Robert E. Tallman
(74) *Attorney, Agent, or Firm* — Oblon, McClelland, Maier & Neustadt, L.L.P.

(57) ABSTRACT

An optical device includes: a base including a mounting surface; and an optical component including an optical element part, a support part including a first adhered surface bonded to the mounting surface via a photocurable first adhesive, the support part being configured to support the optical element part, and an optical opening part provided adjacent to the first adhered surface, the optical opening part allowing light for curing the first adhesive to pass through.

14 Claims, 8 Drawing Sheets

(56) References Cited

FOREIGN PATENT DOCUMENTS

| | | |
|---|---|---|
| JP | 2005-234058 A | 9/2005 |
| JP | 2008-51979 A | 3/2008 |
| JP | 2017-98335 A | 6/2017 |

OTHER PUBLICATIONS

Combined Chinese Office Action and Search Report issued on Jun. 22, 2023 in Chinese Patent Application No. 202180012203.0 (with unedited computer-generated English translation of Office Action), 13 pages.

\* cited by examiner

OPTICAL DEVICE AND OPTICAL COMPONENT

This application is a continuation of International Application No. PCT/JP2021/002905, filed on Jan. 27, 2021 which claims the benefit of priority of the prior Japanese Patent Application No. 2020-016616, filed on Feb. 3, 2020, the entire contents of which are incorporated herein by reference.

BACKGROUND

The present disclosure relates to an optical device and an optical component.

In the related art, an optical device including a substrate and an optical component such as a lens bonded to the substrate by an ultraviolet curable adhesive has been known (Japanese Patent Application Laid-open No. 2017-098335).

SUMMARY

For example, in the case of an optical device including a silicon lens as a lens, because silicon does not transmit ultraviolet light, the silicon lens blocks the ultraviolet light, and the ultraviolet curable adhesive may not be sufficiently irradiated with ultraviolet light. Hence, bonding of the lens may become difficult.

There is a need for a new configuration capable of easily obtaining a better bonding state, in an optical device in which an optical component is bonded to a base by a photocurable adhesive.

According to one aspect of the present disclosure, there is provided an optical device including: a base including a mounting surface; and an optical component including an optical element part, a support part including a first adhered surface bonded to the mounting surface via a photocurable first adhesive, the support part being configured to support the optical element part, and an optical opening part provided adjacent to the first adhered surface, the optical opening part allowing light for curing the first adhesive to pass through.

According to another aspect of the present disclosure, there is provided an optical device, including: a base including a mounting surface; an optical component including an optical element part, and a support part including a first adhered surface bonded to the mounting surface via a photocurable first adhesive, the support part being configured to support the optical element part; and a mirror configured to reflect light for curing the first adhesive to the first adhesive.

According to still another aspect of the present disclosure, there is provided an optical component including: an optical element part; and a support part including a first adhered surface bonded to a mounting surface of a base via a first adhesive, the support part being configured to support the optical element part, and including an optical opening part adjacent to the first adhered surface, the optical opening part allowing light for curing the first adhesive to pass through.

DETAILED DESCRIPTION

Hereinafter, exemplary embodiments and modifications of the present disclosure will be disclosed. The configurations of the embodiments and modifications described below, and the actions and results (effects) brought about by the configurations are merely examples. The present disclosure may also be implemented by configurations other than those disclosed in the following embodiments and modifications. Moreover, according to the present disclosure, it is possible to obtain at least one of various effects (including derivative effects) obtained by the configurations.

The embodiments and modifications described below have similar configurations. Thus, according to the configuration of each embodiment and modification, it is possible to obtain the same actions and effects based on the similar configuration. Moreover, in the following, the same reference numerals denote the same components, and the repeated description thereof may be omitted.

In the present specification, ordinal numbers are given for convenience to distinguish components, portions, and the like, and are not intended to indicate priority or order.

Moreover, in each drawing, the X direction is represented by an arrow X, the Y direction is represented by an arrow Y, and the Z direction is represented by an arrow Z. The X direction, Y direction, and Z direction intersect with each other and are orthogonal to each other. The X direction and the Y direction may also be referred to as extending directions of a mounting surface, and the Z direction may also be referred to as a height direction, a thickness direction, an alignment direction of support portions, or an orthogonal direction (normal direction) of the mounting surface.

First Embodiment

Figure 1:
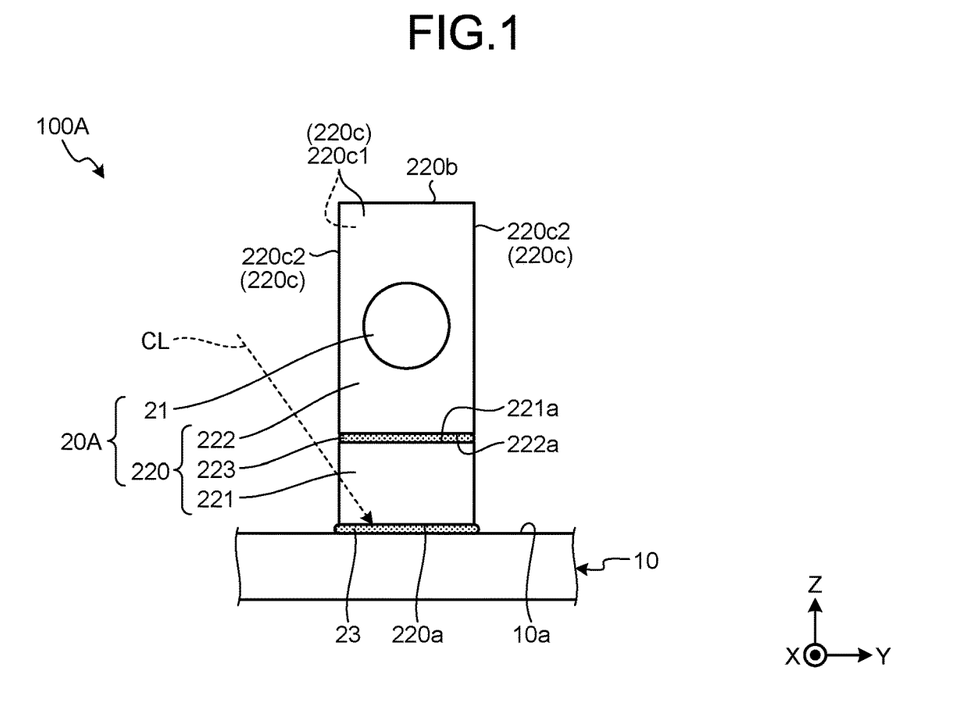
FIG. 1 is an exemplary and schematic side view of an optical device of a first embodiment.

FIG. 1 is a side view of an optical device 100A of the present embodiment. As illustrated in FIG. 1, the optical device 100A includes a substrate 10 and an optical component 20A.

The substrate 10 extends in a direction intersecting with the Z direction. In the present embodiment, the substrate 10 extends in the X direction and the Y direction, and is orthogonal to the Z direction. Moreover, the substrate 10 has a base surface 10a. The base surface 10a has a planar shape, and extends in a direction intersecting with the Z direction. In the present embodiment, the base surface 10a extends in the X direction and the Y direction, and is orthogonal to the Z direction. For example, the substrate 10 is made of a metal material or a ceramic material. The substrate 10 is an example of a base, and the base surface 10a is an example of a mounting surface.

The optical component 20A includes an optical element part 21 and a support part 220.

For example, the optical element part 21 is a portion that optically affects light such as a laser beam. In the present embodiment, for example, the optical element part 21 is a lens such as a convex lens. However, the optical element part 21 is not limited to the convex lens, and for example, may be another lens such as a concave lens, or an optical element such as a prism or a mirror different from the lens. In the present embodiment, the light passes through the optical element part 21 in the X direction.

The support part 220 supports the optical element part 21. The support part 220 has a rectangular parallelepiped shape. The support part 220 has a bottom surface 220a, a top surface 220b, and a side surface 220c.

The bottom surface 220a has a square planar shape, and extends in a direction intersecting with the Z direction. In the present embodiment, the bottom surface 220a extends in the X direction and the Y direction, and is orthogonal to the Z direction.

The bottom surface 220a faces the base surface 10a of the substrate 10. A first adhesive layer 23 is interposed between the base surface 10a and the bottom surface 220a.

The first adhesive layer 23 bonds the base surface 10a to the bottom surface 220a. In other words, the bottom surface 220a is bonded to the base surface 10a via the first adhesive layer 23. The base surface 10a is an example of a mounting surface, and the bottom surface 220a is an example of a first adhered surface.

For example, the first adhesive layer 23 is a photocurable adhesive such as an ultraviolet curable adhesive. The first adhesive layer 23 may also be an adhesive cured by light different from ultraviolet light, such as visible light. The first adhesive layer 23 is an example of a first adhesive.

The top surface 220b has a square planar shape, and extends in a direction intersecting with the Z direction. In the present embodiment, the top surface 220b extends in the X direction and the Y direction, and is orthogonal to the Z direction.

Moreover, the support part 220 has two side surfaces 220c1 and two side surfaces 220c2, as the side surface 220c.

The two side surfaces 220c1 are located on the end in the X direction and on the end in the opposite direction of the X direction. Each of the side surfaces 220c1 has a square planar shape, and extends in a direction intersecting with the X direction. In the present embodiment, the side surface 220c1 extends in the Y direction and the Z direction, and is orthogonal to the X direction.

The two side surfaces 220c2 orthogonal to the two side surfaces 220c1 are located on the end in the Y direction and on the end in the opposite direction of the Y direction. Each of the side surfaces 220c2 has a square planar shape, and extends in a direction intersecting with the Y direction. In the present embodiment, the side surface 220c2 extends in the X direction and the Z direction, and is orthogonal to the Y direction.

Moreover, the support part 220 includes a first support portion 221, a second support portion 222, and a second adhesive layer 223. The first support portion 221 and the second support portion 222 are examples of a support portion.

The first support portion 221 has a rectangular parallelepiped shape. The first support portion 221 has the bottom surface 220a, a part of the side surface 220c, and a top surface 221a.

The top surface 221a has a square planar shape, and extends in a direction intersecting with the Z direction. In the present embodiment, the top surface 221a extends in the X direction and the Y direction, and is orthogonal to the Z direction.

The second support portion 222 has a rectangular parallelepiped shape. The second support portion 222 has the top surface 220b, a part of the side surface 220c, and a bottom surface 222a.

The bottom surface 222a has a square planar shape, and extends in a direction intersecting with the Z direction. In the present embodiment, the bottom surface 222a extends in the X direction and the Y direction, and is orthogonal to the Z direction.

The top surface 221a of the first support portion 221 and the bottom surface 222a of the second support portion 222 face the Z direction. A second adhesive layer 223 is interposed between the top surface 221a and the bottom surface 222a. The second adhesive layer 223 bonds the top surface 221a to the bottom surface 222a. That is, the first support portion 221 and the second support portion 222 are aligned in the Z direction, that is, in a direction orthogonally intersecting with the base surface 10a, and are bonded by the second adhesive layer 223.

The second adhesive layer 223 may be a non-photocurable adhesive, or may be a photocurable adhesive as the first adhesive layer 23. If the second adhesive layer 223 is a photocurable adhesive, the second adhesive layer 223 may be an adhesive cured by light other than ultraviolet light, such as visible light. The second adhesive layer 223 is an example of a second adhesive. For example, the first support portion 221 and the second support portion 222 may also be joined by a coupling method other than adhesion, such as welding or mechanical coupling.

In the present embodiment, the optical component 20A including the support part 220, in which the first support portion 221 and the second support portion 222 are integrated by the second adhesive layer 223, and the optical element part 21 are mounted on the base surface 10a via the first adhesive layer 23. After the position and posture of the optical component 20A are adjusted before the first adhesive layer 23 is cured, the first adhesive layer 23 is irradiated with curing light CL, to cure the first adhesive layer 23.

Moreover, in the present embodiment, the second support portion 222 and the optical element part 21 are integrally molded with the same material. For example, the second support portion 222 and the optical element part 21 are made of silicon. Therefore, if the light CL capable of curing the first adhesive layer 23 (hereinafter, simply referred as the curing light CL) is ultraviolet light or visible light, it is difficult for the curing light CL to pass through the second support portion 222 and the optical element part 21. The curing light CL is emitted from an optical head, which is not illustrated, disposed away from the base surface 10a in the Z direction, in an inclined direction with respect to the base surface 10a, that is, in an inclined direction between the opposite direction of the Z direction, and the Y direction or the opposite direction of the Y direction.

On the other hand, in the present embodiment, for example, the first support portion 221 is made of glass or acrylic. Therefore, if the curing light CL is ultraviolet light or visible light, the curing light CL may easily pass through the first support portion 221. That is, the light transmittance (transmissivity) of the first support portion 221 is higher than that of the second support portion 222. In other words, the light transmittance (transmissivity) of the second support portion 222 is lower than that of the first support portion 221. The first support portion 221 is an example of a high transmittance portion, and the second support portion 222 is an example of a low transmittance portion. The first support portion 221 may also be referred to as a transparent part, and the second support portion 222 may also be referred to as an opaque part. Moreover, the first support portion 221 may also be referred to as an optical opening part with respect to the curing light CL provided in the support part 220.

Moreover, the first support portion 221 includes the bottom surface 220a. In other words, the first support portion 221 is adjacent to the bottom surface 220a. Therefore, as illustrated in FIG. 1, a part of the curing light CL may pass through the first support portion 221, and reach the first adhesive layer 23.

As described above, in the present embodiment, the optical component 20A includes the optical element part 21 and the support part 220. Moreover, the support part 220 has the first support portion 221 (optical opening part) adjacent to the bottom surface 220a (first adhered surface).

With such a configuration, the curing light CL may pass through the first support portion 221 and reach the first adhesive layer 23 (first adhesive). Thus, compared to a configuration in which the support part 220 does not have the first support portion 221 but only has the second support portion 222 through which the curing light CL is difficult to pass, it is possible to irradiate a wider area of the first adhesive layer 23 with the curing light CL. Consequently, the adhesive strength of the first adhesive layer 23 is likely to further increase.

Moreover, in the present embodiment, for example, the support part 220 includes the first support portion 221 (high transmittance portion) that transmits the curing light CL as the optical opening part, and the second support portion 222 (low transmittance portion) the transmittance (transmissivity) of the curing light CL of which is lower than that of the first support portion 221.

With such a configuration, for example, the support part 220 provided with the optical opening part, which is adjacent to the bottom surface 220a (first adhered surface), may be implemented as a relatively simple structure including the first support portion 221 and the second support portion 222.

Moreover, in the present embodiment, for example, the support part 220 has the first support portion 221 and the second support portion 222 (a plurality of support portions) that are aligned in the Z direction (a direction intersecting with the base surface 10a (mounting surface)) and that are bonded to each other.

With such a configuration, for example, the support part 220 having a plurality of portions with different optical transmittance may be implemented as a relatively simple structure.

First Modification

Figure 2:
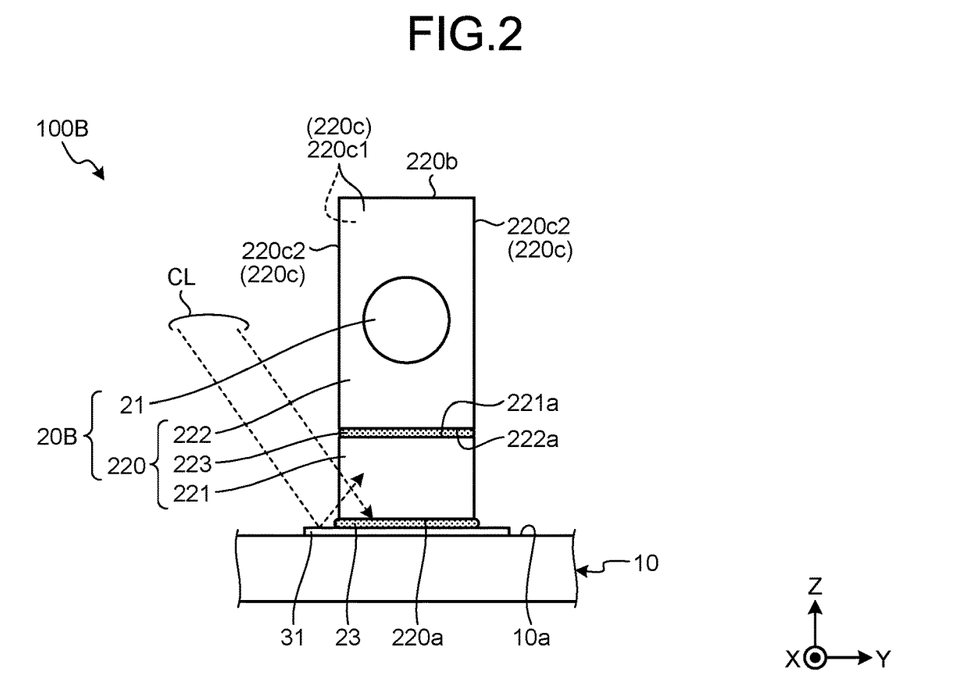
FIG. 2 is an exemplary and schematic side view of an optical device of a first modification.

FIG. 2 is a side view of an optical device 100B of a first modification. As illustrated in FIG. 2, the optical device 100B includes the substrate 10 and an optical component 20B.

However, in the present embodiment, the optical component 20B is mounted on a metallized layer 31 provided on the base surface 10a of the substrate 10 via the first adhesive layer 23. The metallized layer 31 is provided on the base surface 10a. The metallized layer 31 extends along the base surface 10a, and extends in a direction intersecting with the Z direction. In the present embodiment, the metallized layer 31 extends in the X direction and the Y direction, and is orthogonal to the Z direction.

For example, the metallized layer 31 is made of a metal material such as copper or a copper alloy, and is configured such that the curing light CL may be reflected on the surface. Moreover, for example, the metallized layer 31 may be made by sputtering, vapor deposition, or the like.

The first adhesive layer 23 is adjacent to the metallized layer 31. In other words, the metallized layer 31 is adjacent to the first adhesive layer 23 in the opposite direction of the Z direction. That is, the metallized layer 31 is adjacent to the first adhesive layer 23 in the opposite direction from the optical head (not illustrated) that emits the curing light CL. Thus, a part of the curing light CL reflected by the metallized layer 31 may reach the first adhesive layer 23.

Moreover, in the present embodiment, the metallized layer 31 projects to the outside of the first adhesive layer 23 along the base surface 10a. Furthermore, the metallized layer 31 is provided adjacent to the first support portion 221. Therefore, as illustrated in FIG. 2, a part of the curing light CL reflected by the metallized layer 31 may enter the first support portion 221, pass through the first support portion 221, and reach the second adhesive layer 223. Moreover, the curing light CL that is not absorbed by the first adhesive layer 23 and that has passed through the first adhesive layer 23, that is, the remaining curing light CL, may be reflected by the metallized layer 31 and may enter the first adhesive layer 23 again, or may pass through the first adhesive layer 23 and the first support portion 221, and reach the second adhesive layer 223. In the following, the curing light CL that has entered the first adhesive layer 23 or the second adhesive layer 223, but remained without being absorbed, is referred to as residual light.

As described above, in the present modification, the optical device 100B includes the metallized layer 31 (mirror) that reflects light to the first adhesive layer 23 (first adhesive).

Moreover, in the present modification, the optical device 100B includes the metallized layer 31 adjacent to the first adhesive layer 23.

With such a configuration, for example, compared to when there is no metallized layer 31, the curing light CL may reach the first adhesive layer 23 more easily. Consequently, advantages such as enhancing the first adhesive layer 23 to be cured more easily and with more certainty, or an increase in the cured area of the first adhesive layer 23, may be obtained.

Moreover, in the present modification, the metallized layer 31 is provided on the base surface 10a (mounting surface).

With such a configuration, for example, it is possible to provide the metallized layer 31 more easily or with more certainty.

Moreover, in the present modification, the second adhesive layer 223 (second adhesive) is a photocurable adhesive, and the optical component 20B includes the metallized layer 31 (mirror) that reflects light to the second adhesive layer 223.

With such a configuration, for example, compared to when there is no metallized layer 31, the curing light CL may reach the second adhesive layer 223 more easily. Consequently, advantages such as enhancing the second adhesive layer 223 to be cured more easily and with more certainty, or an increase in the cured area of the second adhesive layer 223, may be obtained.

Moreover, in the present modification, the metallized layer 31 is provided adjacent to the first support portion 221 (optical opening part).

With such a configuration, for example, the curing light CL reflected by the metallized layer 31 may pass through the first support portion 221 and reach the second adhesive layer 223, and the curing light CL may reach the second adhesive layer 223 more easily. Consequently, advantages such as enhancing the second adhesive layer 223 to be cured more easily and with more certainty, or an increase in the cured area of the second adhesive layer 223, may be obtained.

Second Modification

Figure 3:
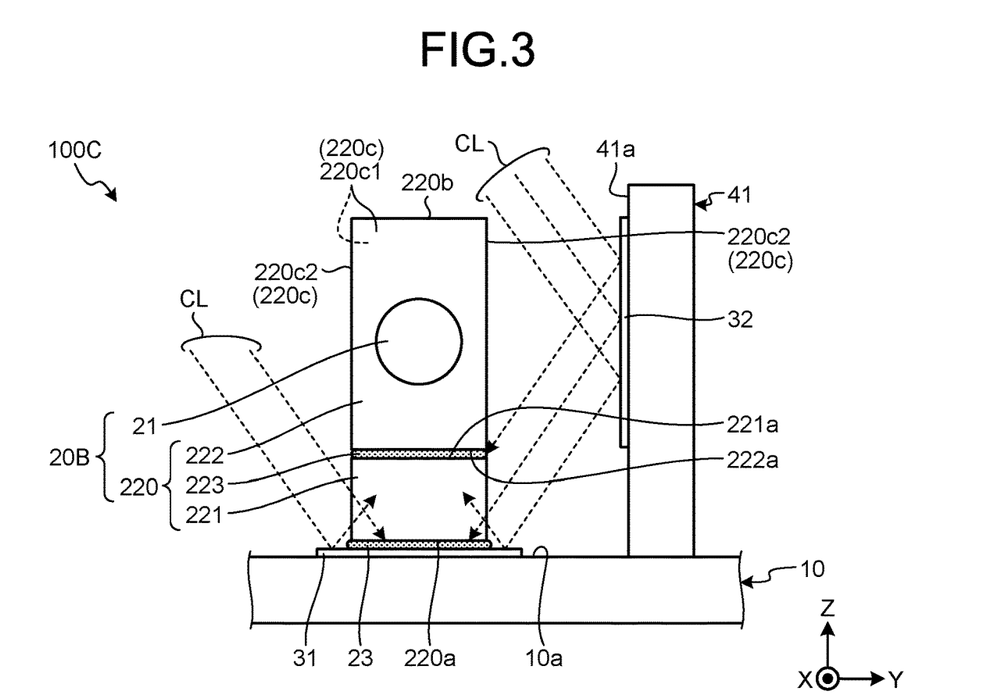
FIG. 3 is an exemplary and schematic side view of an optical device of a second modification.

FIG. 3 is a side view of an optical device 100C of a second modification. As illustrated in FIG. 3, the optical device 100C includes the substrate 10, the optical component 20B having the same configuration as that of the first modification, and a component 41.

The component 41 is mounted on the base surface 10a. The component 41 may be an optical component or a component other than the optical component. The component 41 is an example of another component.

The component 41 has a side surface 41a that faces the optical component 20B. A metallized layer 32 that reflects the curing light CL is provided on the side surface 41a. The metallized layer 32 has a square planar shape, and extends in a direction intersecting with the Y direction. In the present embodiment, the metallized layer 32 extends in the X direction and the Z direction, and is orthogonal to the Y direction. The metallized layer 32 may be made of the same material as that of the metallized layer 31, and may be made by the same manufacturing method as that of the metallized layer 31. The component 41 in which the metallized layer 32 is provided on the side surface 41a is mounted on the base surface 10a. In the present modification, the metallized layer 32 is provided on the side surface 41a. However, it is not limited thereto, and for example, the metallized layer 32 may also be provided on another location such as on the top surface of the component 41.

The metallized layer 32 faces the first adhesive layer 23 and the second adhesive layer 223. Therefore, as illustrated in FIG. 3, a part of the curing light CL reflected by the metallized layer 32 may reach the first adhesive layer 23 and the second adhesive layer 223. In this case, a part of the curing light CL passes through the first support portion 221 and reaches the first adhesive layer 23. That is, the metallized layer 32 reflects the curing light CL such that the curing light CL is directed to the first adhesive layer 23 via the first support portion 221.

Moreover, the metallized layer 32 also faces the metallized layer 31. Therefore, as illustrated in FIG. 3, a part of the curing light CL reflected by the metallized layer 32 may be further reflected by the metallized layer 31, enter the first support portion 221, pass through the first support portion 221, and reach the second adhesive layer 223.

As described above, in the present modification, the optical device 100C includes the component 41 (another component) mounted on the base surface 10a, and the metallized layer 32 (mirror) is provided on the component 41.

With such a configuration, for example, compared to when there is no metallized layer 32, the curing light CL may reach the first adhesive layer 23 or the second adhesive layer more easily. Consequently, advantages such as enhancing the first adhesive layer 23 or the second adhesive layer 223 to be cured more easily and with more certainty, or an increase in the cured area of the first adhesive layer 23 or the second adhesive layer 223, may be obtained. Moreover, by using the component 41 mounted on the base surface 10a, the metallized layer 32 may be disposed on a more suitable location.

Moreover, in the present modification, the metallized layer 32 reflects the curing light CL such that the curing light CL is directed to the first adhesive layer 23 via the first support portion 221 (optical opening part).

With such a configuration, for example, the curing light CL may reach the first adhesive layer 23 more easily. Consequently, compared to when there is no metallized layer 32 and the first support portion 221, advantages such as enhancing the first adhesive layer 23 to be cured more easily and with more certainty, or an increase in the cured area of the first adhesive layer 23, may be obtained.

For example, another component on which the metallized layer 32 is provided may also be a (wall of a) case that houses the optical device 100C, a component fixed to the case, or a component not mounted on the substrate 10.

Third Modification

Figure 4:
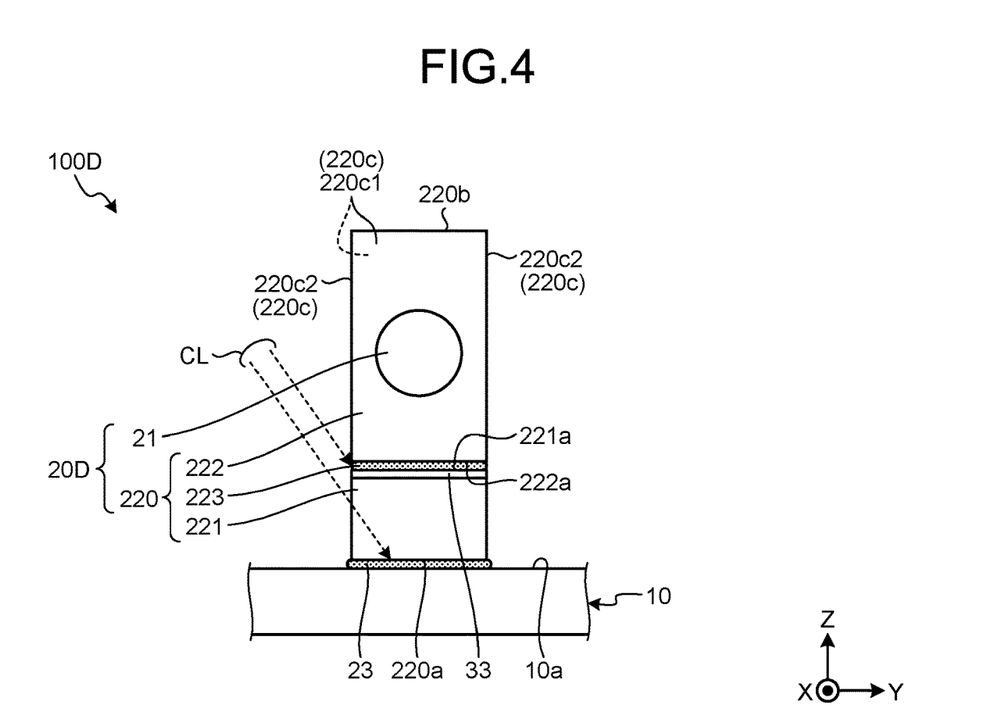
FIG. 4 is an exemplary and schematic side view of an optical device of a third modification.

FIG. 4 is a side view of an optical device 100D of a third modification. As illustrated in FIG. 4, the optical device 100D includes the substrate 10 and an optical component 20D.

As illustrated in FIG. 4, the optical component 20D of the present modification includes a metallized layer 33 adjacent to the second adhesive layer 223 and that reflects the curing light CL. The metallized layer 33 is adjacent to the second adhesive layer 223 in the opposite direction of the Z direction. In other words, the metallized layer 33 is provided between the second adhesive layer 223 and the first support portion 221. Thus, a part of the curing light CL reflected by the metallized layer 33 enters the second adhesive layer 223. The metallized layer 33 may be made of the same material as that of the metallized layer 31, and may be made by the same manufacturing method as that of the metallized layer 31. The first support portion 221, in which the metallized layer 33 is provided on the top surface 221a, and the second support portion 222 are connected via the second adhesive layer 223.

With such a configuration, for example, compared to when there is no metallized layer 33, advantages such as enhancing the second adhesive layer 223 to be cured more easily and with more certainty, or an increase in the cured area of the second adhesive layer 223, may be obtained.

Fourth Modification

Figure 5:
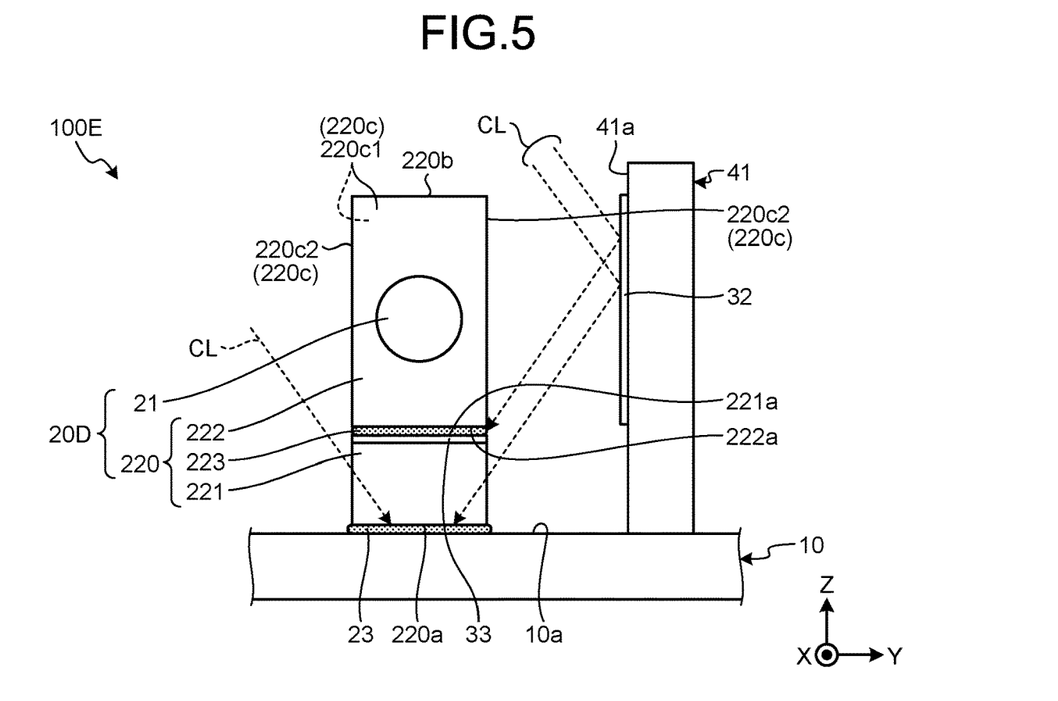
FIG. 5 is an exemplary and schematic side view of an optical device of a fourth modification.

FIG. 5 is a side view of an optical device 100E of a fourth modification. The optical device 100E of the present modification includes the substrate 10, the optical component 20D having the same configuration as that of the third modification, and the component 41 having the same configuration as that of the second modification.

With such a configuration, for example, it is possible to obtain the same effects as those in the third modification by the metallized layer 33, and the same effects as those in the second modification by the metallized layer 32 provided on the component 41.

Fifth Modification

Figure 6:
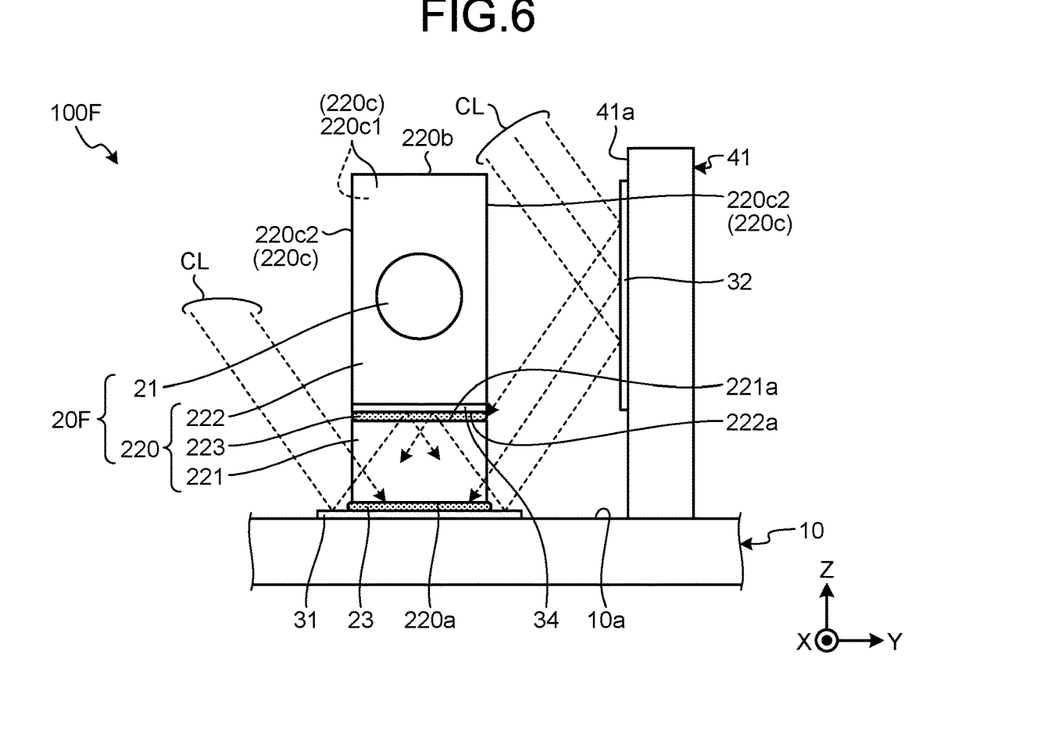
FIG. 6 is an exemplary and schematic side view of an optical device of a fifth modification.

FIG. 6 is a side view of an optical device 100F of a fifth modification. The optical device 100F of the present modification includes the substrate 10 in which the metallized layer 31 is provided on the base surface 10a, an optical component 20F having a metallized layer 34 that reflects the curing light CL, and the component 41 having the same configuration as that of the second modification.

The metallized layer 34 has a square planar shape, and extends in a direction intersecting with the Z direction. In the present modification, the metallized layer 34 extends in the X direction and the Y direction, and is orthogonal to the Z direction. The metallized layer 34 may be made of the same material as that of the metallized layer 31, and may be made by the same manufacturing method as that of the metallized layer 31.

The metallized layer 34 is adjacent to the second adhesive layer 223. However, in the present modification, the metallized layer 34 is adjacent to the second adhesive layer 223 in the Z direction. In other words, the metallized layer 34 is located on the opposite side of the metallized layer 31 with respect to the first support portion 221 and the second adhesive layer 223. Thus, the first support portion 221 is interposed between the first adhesive layer 23 and the second adhesive layer 223 in the Z direction. Moreover, the first adhesive layer 23, the second adhesive layer 223, and the first support portion 221 are interposed between the metallized layer 31 and the metallized layer 34 in the Z direction.

As described above, in the present modification, the optical device 100F includes the metallized layer 31 and the metallized layer 34 provided with the first support portion 221 interposed therebetween.

With such a configuration, for example, the curing light CL and the residual light may reach a portion further away from the side surface 220c1 of the optical component 20F, in the first adhesive layer 23 and the second adhesive layer 223, while being repeatedly reflected by the metallized layers 31 and 34, and passing through the first support portion 221. Thus, for example, advantages such as enhancing the first adhesive layer 23 or the second adhesive layer 223 to be cured more easily and with more certainty, or an increase in the cured area of the first adhesive layer 23 or the second adhesive layer 223, may be obtained.

Moreover, in the present modification, the curing light CL reflected by the metallized layers 31, 32, and 34 may reach the first adhesive layer 23 more easily. Hence, the optical component 20F, in which the first support portion 221 and the second support portion 222 are integrally formed via the second adhesive layer 223, may be mounted on the base surface 10a of the substrate 10 in advance.

Furthermore, in the case when the optical component 20F, in which the first support portion 221 and the second support portion 222 are integrally formed via the second adhesive layer 223, is mounted on the base surface 10a of the substrate 10 in advance, the positions of the metallized layer 33 and the second adhesive layer 223 may be replaced with each other. That is, the metallized layer 33 may be provided so as to come into contact with the first support portion 221 serving as the optical opening part.

Sixth Modification

Figure 7:
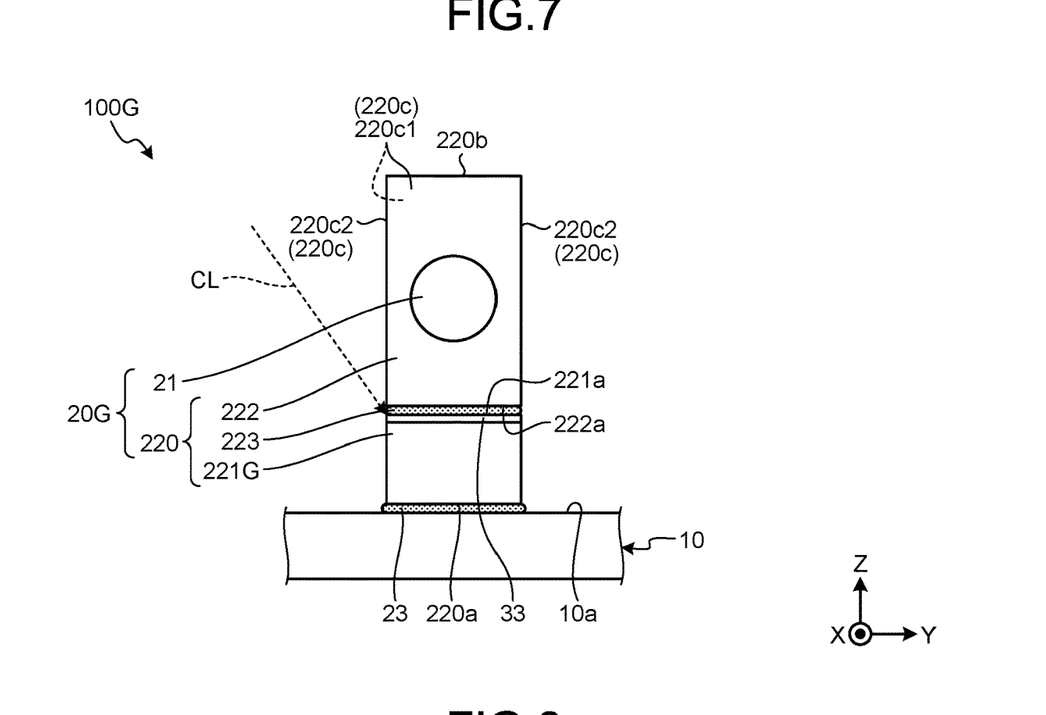
FIG. 7 is an exemplary and schematic side view of an optical device of a sixth modification.

FIG. 7 is a side view of an optical device 100G of a sixth modification. An optical component 20G of the present modification includes a first support portion 221G serving as a low transmittance portion, instead of the first support portion 221 serving as a high transmittance portion in the optical component 20D of the third modification.

However, in the present modification also, similar to the third modification, the optical component 20G includes the metallized layer 33 adjacent to the second adhesive layer 223 and that reflects the curing light CL. Thus, for example, the curing light CL may reach the second adhesive layer 223 more easily. Consequently, compared to when there is no metallized layer 33, advantages such as the second adhesive layer 223 may be cured more easily and with more certainty, or an increase in the cured area of the second adhesive layer 223, may be obtained.

Moreover, in this case, the first support portion 221 provided with the metallized layer 34 may be mounted on the base surface 10a of the substrate 10 via the first adhesive layer 23, which is not photocurable, and the second support portion 222 may be bonded to the metallized layer 34 via the photocurable second adhesive layer 223. In general, the curing light CL emitted from the optical head (not illustrated), which is disposed away from the base surface 10a in the Z direction, is more difficult to reach the adhesive layer as the distance from the base surface 10a is reduced, by being blocked by the optical component 20G or other components (not illustrated). In this regard, with the present modification, the second adhesive layer 223 that needs to be irradiated with the curing light CL, may be moved further away from the base surface 10a. Hence, for example, advantages such as the optical component 20G may be mounted on the base surface 10a more easily or with more certainty, may be obtained.

Seventh Modification

Figure 8:
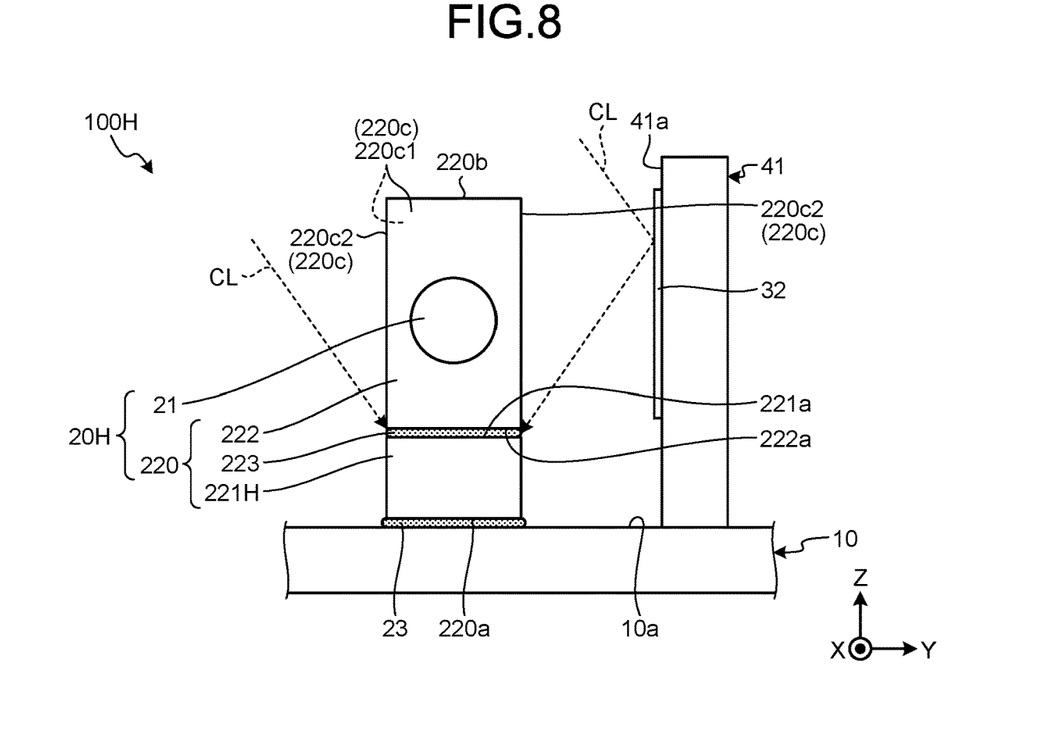
FIG. 8 is an exemplary and schematic side view of an optical device of a seventh modification.

FIG. 8 is a side view of an optical device 100H of a seventh modification. An optical component 20H of the present modification has a first support portion 221H serving as a low transmittance portion, instead of the first support portion 221 serving as a high transmittance portion in the optical component 20A of the first embodiment.

Moreover, in the present modification, similar to the third modification, the component 41 having the metallized layer 32 is mounted on the base surface 10a. The metallized layer 32 faces the second adhesive layer 223. Therefore, as illustrated in FIG. 8, a part of the curing light CL reflected by the metallized layer 32 may reach the second adhesive layer 223.

With such a configuration, for example, it is possible to obtain the same effects as those in the sixth modification in which the photocurable second adhesive layer 223 is disposed away from the base surface 10a, and the same effects as those in the second modification obtained by the metallized layer 32.

Eighth Modification

Figure 9:
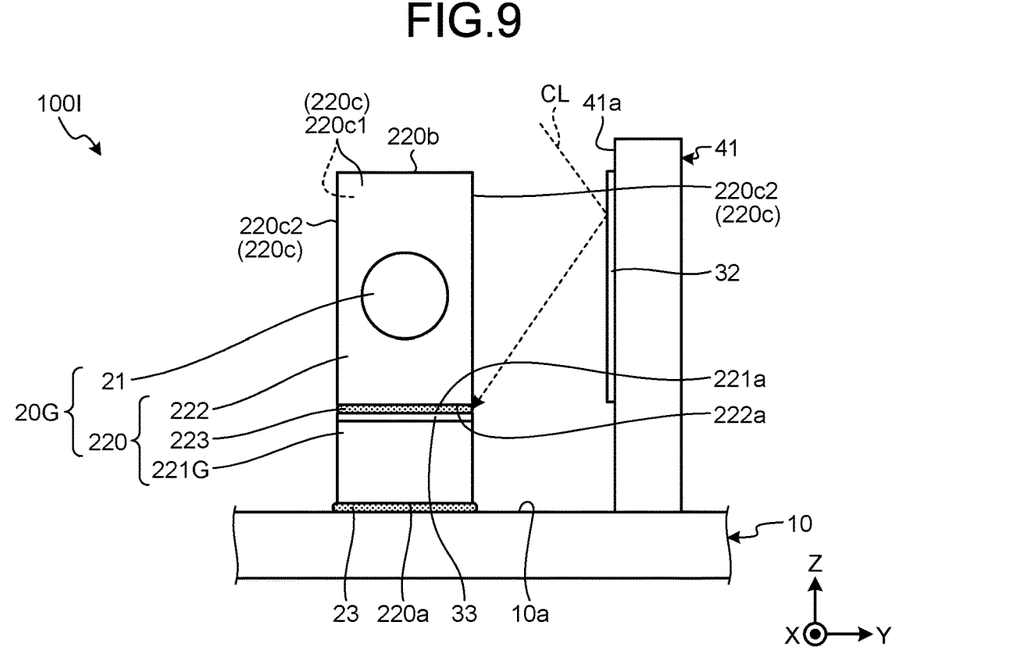
FIG. 9 is an exemplary and schematic side view of an optical device of an eighth modification.

FIG. 9 is a side view of an optical device 100I of an eighth modification. The optical device 100I of the present modification includes the optical component 20G in the sixth modification instead of the optical component 20H in the optical device 100H of the seventh modification.

With such a configuration, for example, it is possible to obtain the same effects as those in the sixth modification by the metallized layer 34 adjacent to the photocurable second adhesive layer 223, and the same effects as those in the second modification by the metallized layer 32 provided in the component 41.

Ninth Modification

Figure 10:
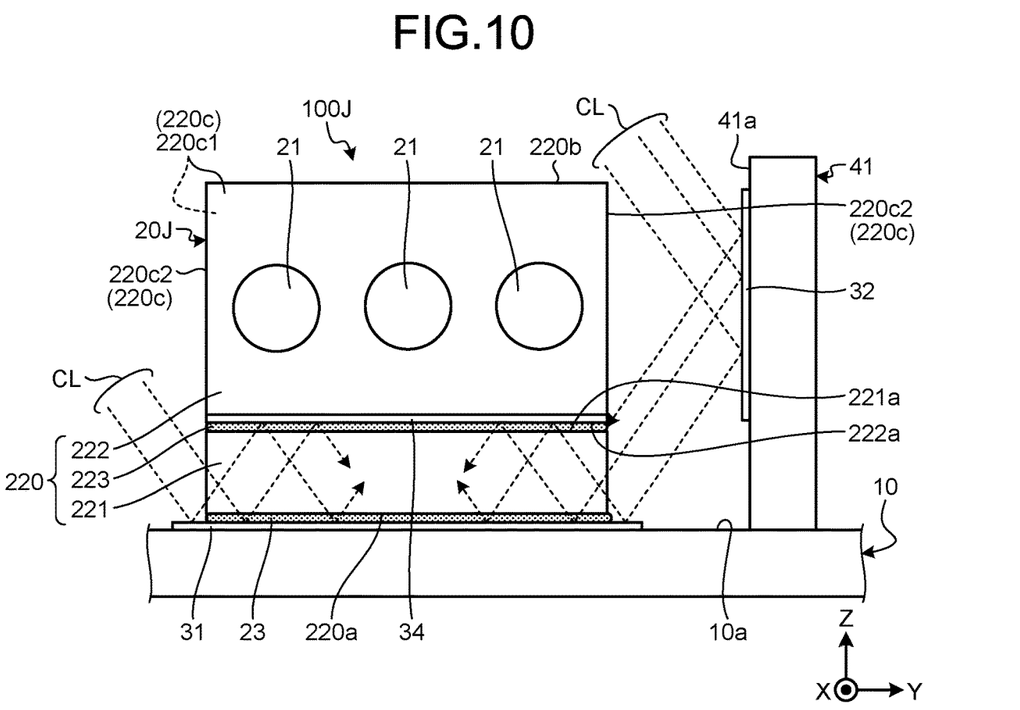
FIG. 10 is an exemplary and schematic side view of an optical device of a ninth modification.

FIG. 10 is a side view of an optical device 100J of a ninth modification. The optical device 100J of the present modification includes an optical component 20J serving as an array lens, instead of the optical component 20F in the optical device 100F of the fifth modification.

The support part 220 includes a plurality of the optical element parts 21 serving as lens parts spaced apart in the Y direction. Even with such a configuration, it is possible to obtain the same effects as those in the fifth modification.

Tenth Modification

Figure 11:
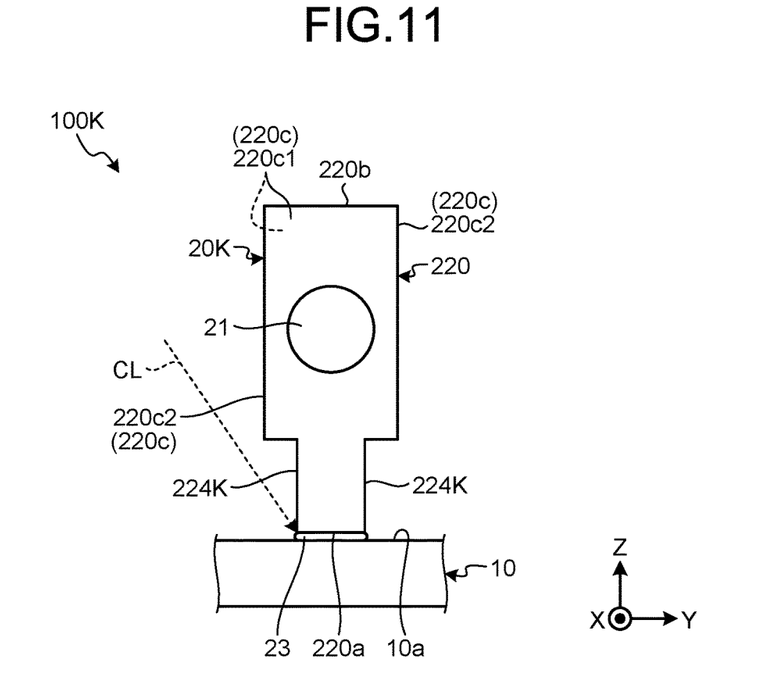
FIG. 11 is an exemplary and schematic side view of an optical device of a tenth modification.

FIG. 11 is a side view of an optical device 100K of a tenth modification. Two concave parts 224K serving as optical opening parts are provided on the support part 220 of an optical component 20K of the present modification. Each of the concave parts 224K is recessed in the Y direction or in the opposite direction of the Y direction along the base surface 10a, from an end close to the base surface 10a, in other words, from an end in the opposite direction of the Z direction, of the side surface 220c2 of the support part 220. In the present modification, the height of the concave parts 224K in the Z direction is approximately constant.

With such a configuration, for example, by providing the concave part 224K serving as an optical opening part on the support part 220, it is possible to suppress the curing light CL from being blocked by the support part 220 at the portion where the concave part 224K is provided, and the curing light CL may reach the first adhesive layer 23 more easily. Consequently, advantages such as enhancing the first adhesive layer 23 to be cured more easily and with more certainty, and an increase in the cured area of the first adhesive layer 23, may be obtained.

Eleventh Modification

Figure 12:
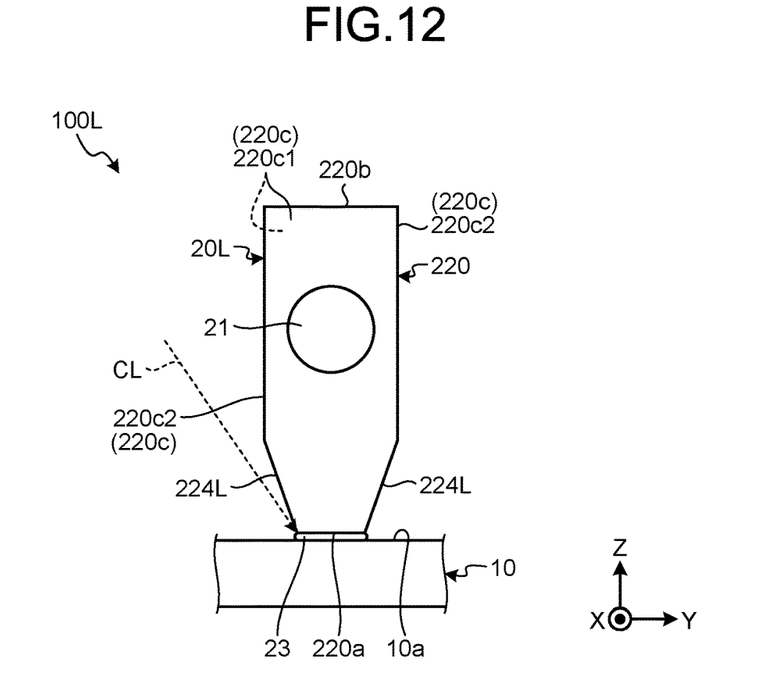
FIG. 12 is an exemplary and schematic side view of an optical device of an eleventh modification.

FIG. 12 is a side view of an optical device 100L of an eleventh modification. A concave part 224L is provided on the support part 220 in an optical component 20L of the present modification, instead of the concave part 224K in the tenth modification. The height of concave part 224L in the Z direction is gradually reduced as going away from the side surface 220c2 of the support part 220. Even with such a configuration, it is possible to obtain the same effects as those in the tenth modification, because it is possible to suppress the curing light CL from being blocked by the support part 220 at the portion where the concave part 224L is provided.

Twelfth Modification

Figure 13:
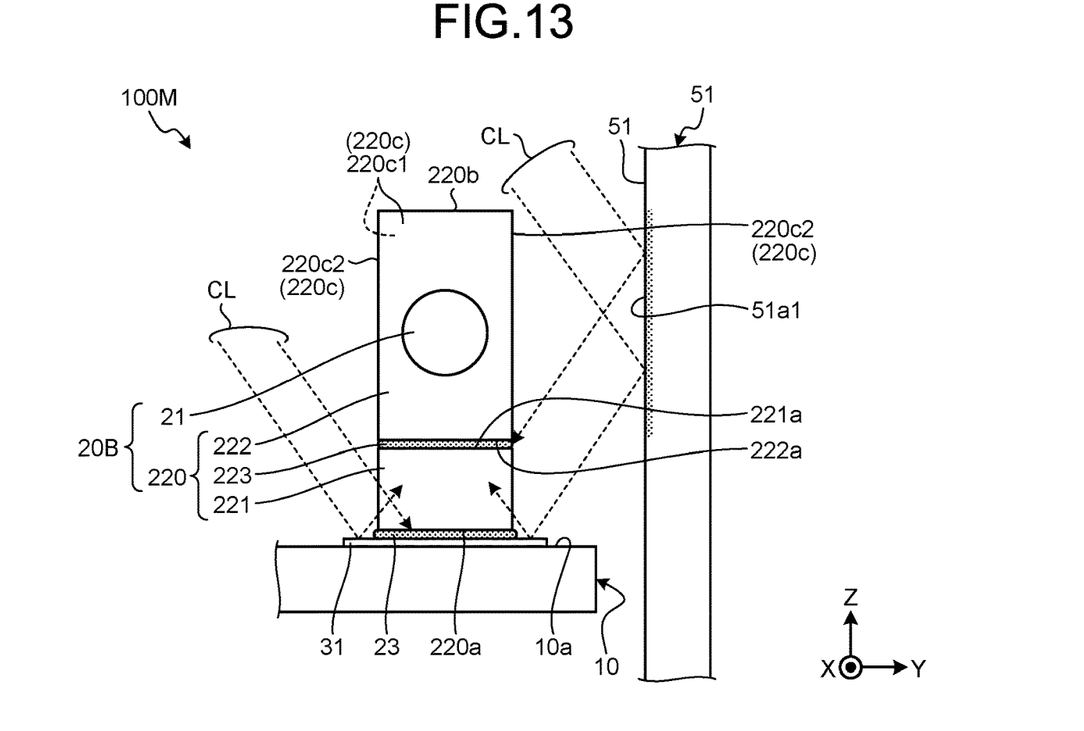
FIG. 13 is an exemplary and schematic side view of an optical device of a twelfth modification.

FIG. 13 is a side view of an optical device 100M of a twelfth modification. In the optical device 100M of the present modification, a mirror surface area 51a1 is provided on an inner surface 51a of a side wall 51 of a case 50, instead of the metallized layer 32 and the component 41 in the optical device 100C of the second modification. Similar to the metallized layer 32, the mirror surface area 51a1 may reflect the curing light CL to the first adhesive layer 23 and the second adhesive layer 223. The mirror surface area 51a1 may be implemented relatively easily, by partially mirror processing a part of the inner surface 51a of the side wall 51. The mirror surface area 51a1 is an example of a mirror.

Thirteenth Modification

Figure 14:
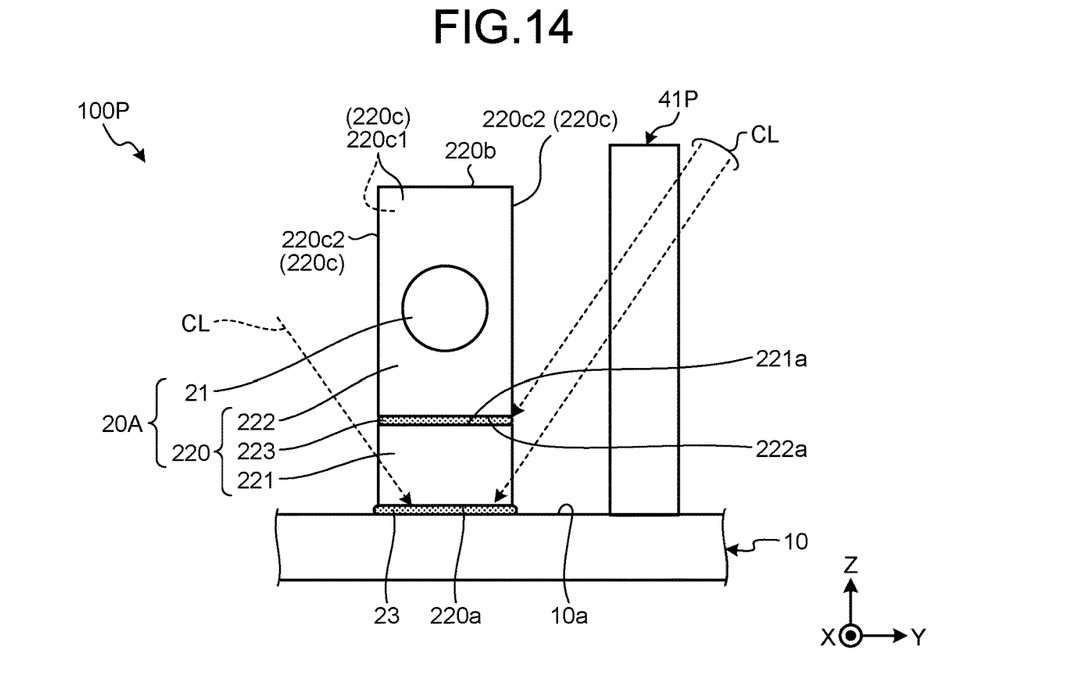
FIG. 14 is an exemplary and schematic side view of an optical device of a thirteenth modification.

FIG. 14 is a side view of an optical device 100P of a thirteenth modification. As illustrated in FIG. 14, the optical device 100P of the present modification includes the substrate 10 and the optical component 20A having the same configurations as those in the first embodiment, and a component 41P (another component).

However, in the present modification, for example, the component 41P is made of a material that transmits the curing light CL such as glass or acrylic. Thus, the curing light CL may pass through the component 41P, and reach the first adhesive layer 23 and the second adhesive layer 223. With such a configuration, for example, the curing light CL may reach the first adhesive layer 23 and the second adhesive layer 223 more easily. The component 41P is an example of a transmission member. In the present modification, the entire component 41P is made of a material that transmits the curing light CL. However, it is not limited thereto, and at least a part of the component 41P may transmit the curing light CL. Moreover, for example, the component 41P may also be a (wall of a) case that houses the optical device 100P, a component such as a window member fixed to the case or another component, a component not mounted on the substrate 10, or the like. Furthermore, although not illustrated, the optical device 100P may be configured such that the curing light CL reaches the first adhesive layer 23 or the second adhesive layer 223 via at least one of the metallized layers 31 to 34 and the component 41P. In this case, the layout of the metallized layers 31 to 34 and the component 41P, the number of the metallized layers 31 to 34 through which the curing light CL pass, the order of the curing light CL passing through the metallized layers 31 to 34 and the component 41P, and the like may be set in various ways.

Second Embodiment

Figure 15:
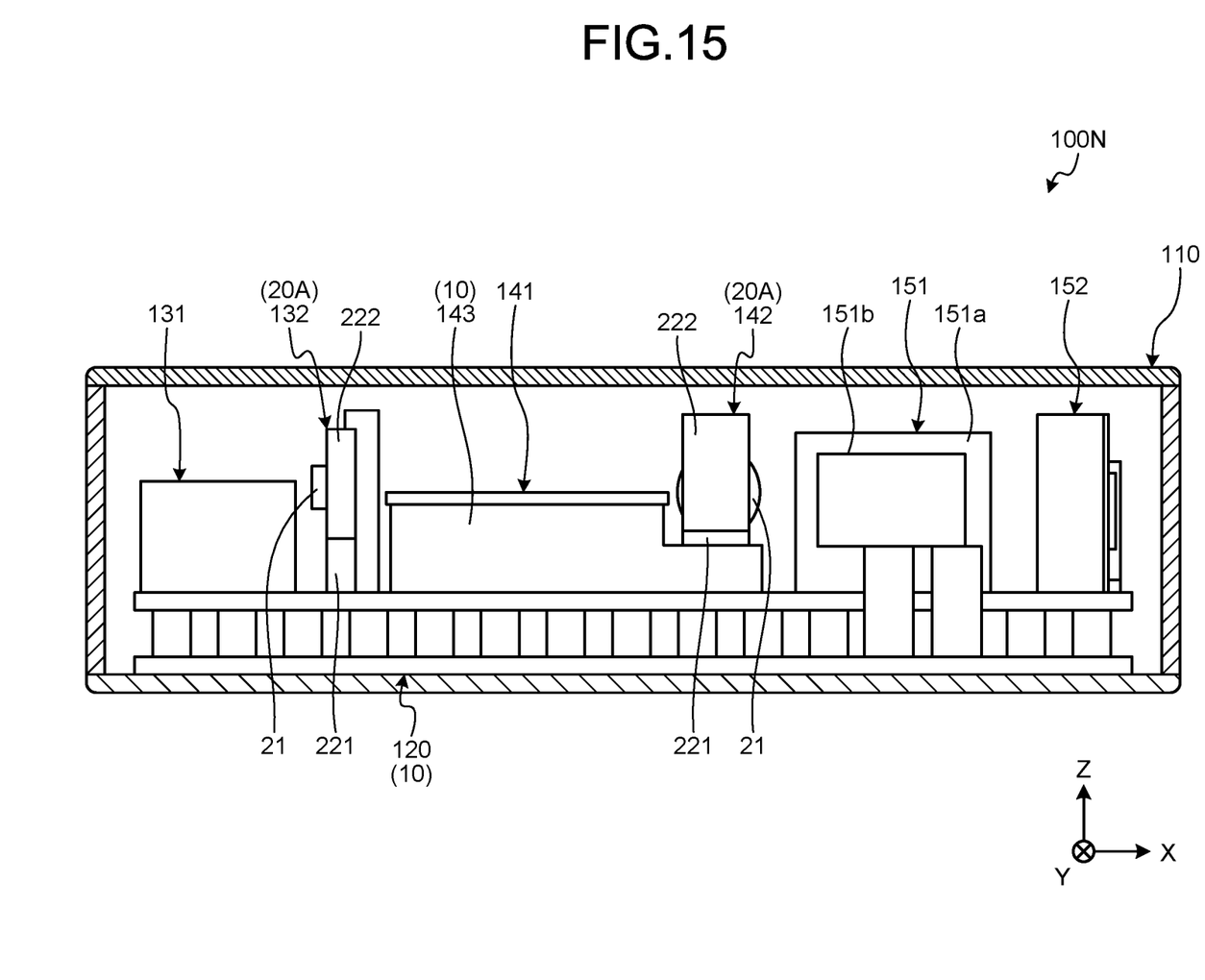
FIG. 15 is an exemplary and schematic side view illustrating an internal configuration of an optical device of a second embodiment.

FIG. 15 is a side view illustrating an internal configuration of an optical device 100N. As illustrated in FIG. 15, the optical device 100N includes a case 110, and a base 120, a waveguide element 131, a lens 132, a light emitting element 141, a lens 142, an optical isolator 151, and a beam splitter 152 that are housed inside the case 110.

The base 120 functions as a base of an optical component, and controls the temperature of the optical component, by heating or cooling the optical component. The base 120 may also be referred to as a Peltier module or a thermoelectric module.

For example, the light emitting element 141, which is an optical function element, is a variable wavelength laser element. The light emitting element 141 is mounted on a top surface 120a of the base 120 via a carrier 143. The carrier 143 is made of an insulating material with high thermal conductivity, and transfers the heat generated by the light emitting element 141 to the base 120. The carrier 143 may also be referred to as a submount.

The light emitting element 141 outputs a laser beam to the lens 142. For example, the wavelength of the laser beam is between 900 nm or more and 1650 nm or less, which is suitable wavelength for optical communication.

The lens 142 is fixed to the carrier 143. The lens 142 affects the laser beam from the light emitting element 141 by refractive index, and collimates the laser beam. The laser beam output from the lens 142 is supplied to the optical isolator 151.

The optical isolator 151 includes a magnet 151a, and an optical element part 151b that includes a magneto-optical element and a polarizing plate. The optical isolator 151 polarizes the laser beam from the optical element part 151b and affects the laser beam from the optical element part 151b magneto-optically. The laser beam output from the optical isolator 151 is supplied to the beam splitter 152. The optical isolator 151 prevents light from the beam splitter 152 from being passed to the light emitting element 141.

The beam splitter 152 outputs the laser beam from the optical isolator 151 to the outside of the optical device 100N, spectrally separates the laser beam from the optical isolator 151, and supplies the laser beam to a monitor, which is not illustrated.

Moreover, the light emitting element 141 outputs a back laser beam with a relatively weak power to a side opposite from the lens 142. The lens 132 condenses the back laser beam, and outputs the condensed laser beam to the waveguide element 131.

For example, the waveguide element 131 is a planar lightwave circuit element, and includes a ring filter the transmission characteristics of which change periodically with respect to the wavelength. The waveguide element 131 splits the back laser beam, guides one of the split back laser beams, and outputs the laser beam to a monitor, which is not illustrated. The waveguide element 131 also transmits the other split back laser beam through the ring filter, and outputs to the monitor, which is not illustrated.

In such a configuration, the lenses 132 and 142 may be configured as the optical component 20A including the first support portion 221, the second support portion 222, and the optical element part 21 as in the first embodiment described above. Moreover, the base 120 and the carrier 143 are examples of a base. The lenses 132 and 142 may also be configured as the optical components 20B to 20L in the first to twelfth modifications described above.

Thus, with the present embodiment also, it is possible to obtain the same effects as those in the first embodiment and the first to twelfth modifications by the optical components 20A to 20L.

While the embodiments and modifications of the present disclosure have been described above, the embodiments and modifications described above are merely examples and are not intended to limit the scope of the disclosure. The embodiments and modifications described above may be implemented in various other forms, and various omissions, substitutions, combinations, and changes may be made without departing from the gist of the disclosure. Moreover, specifications of each configuration, shape, and the like (structure, type, direction, model, size, length, width, thickness, height, number, arrangement, position, material, and the like) may be implemented with appropriate modifications.

For example, the present disclosure may be applied to an optical device having a different form from the optical device disclosed in the embodiments and modifications.

According to the present disclosure, for example, it is possible to obtain a new configuration capable of easily obtaining a better bonding state, in the optical device in which the optical component is bonded to the mounting surface of the base by a photocurable adhesive.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical device, comprising:
   a base including a mounting surface; and
   an optical component including
     an optical element part,
     a support part including a first adhered surface bonded to the mounting surface via a photocurable first adhesive, the support part being configured to support the optical element part, and
     an optical opening part provided adjacent to the first adhered surface, the optical opening part allowing light for curing the first adhesive to pass through; and
   a mirror configured to reflect the light to the first adhesive.

2. The optical device according to claim 1, wherein the support part includes:
   a high transmittance portion configured to transmit the light as the optical opening part, and
   a low transmittance portion light whose transmittance is lower than the high transmittance portion.

3. The optical device according to claim 1, wherein the optical opening part includes a concave part recessed in a direction along the first adhered surface.

4. The optical device according to claim 1, wherein the mirror is provided adjacent to the first adhesive.

5. The optical device according to claim 1, wherein the mirror is configured to reflect the light such that the light is directed to the first adhesive via the optical opening part.

6. The optical device according to claim 1, wherein the mirror is provided on the mounting surface.

7. The optical device according to claim 1, wherein the mirror is provided adjacent to the optical opening part.

8. The optical device according to claim 1, further comprising:
   another component different from the optical component mounted on the mounting surface, wherein
   the mirror is provided on the other component.

9. The optical device according to claim 1, further comprising:
   a case configured to house the base and the optical component, wherein
   the mirror is provided on an inner surface of the case.

10. The optical device according to claim 1, further comprising another mirror, wherein
   the optical opening part is interposed between the mirror and the other mirror.

11. An optical device, comprising:
   a base including a mounting surface; and
   an optical component including
     an optical element part,
     a support part including a first adhered surface bonded to the mounting surface via a photocurable first adhesive the support part being configured to support the optical element part, and
     an optical opening part provided adjacent to the first adhered surface, the optical opening part allowing light for curing the first adhesive to pass through,
   wherein the support part includes a plurality of support portions aligned in a direction intersecting with the mounting surface, and bonded to each other,
   the optical device further comprises a mirror configured to reflect light for curing a second adhesive bonding the support portions, and
   the second adhesive is a photocurable adhesive.

12. An optical device, comprising:
a base including a mounting surface; and
an optical component including
- an optical element part,
- a support part including a first adhered surface bonded to the mounting surface via a photocurable first adhesive, the support part being configured to support the optical element part, and
- an optical opening part provided adjacent to the first adhered surface, the optical opening part allowing light for curing the first adhesive to pass through, wherein the optical component is a lens array including a plurality of lens parts arranged in parallel as the optical element part.

13. An optical device, comprising:
a base including a mounting surface;
an optical component including
- an optical element part, and
- a support part including a first adhered surface bonded to the mounting surface via a photocurable first adhesive, the support part being configured to support the optical element part; and a mirror configured to reflect light for curing the first adhesive to the first adhesive.

14. An optical device, comprising:
a base including a mounting surface; and
an optical component including
- an optical element part,
- a support part including a first adhered surface bonded to the mounting surface via a photocurable first adhesive, the support part being configured to support the optical element part, and
- an optical opening part provided adjacent to the first adhered surface, the optical opening part allowing light for curing the first adhesive to pass through, wherein the optical opening part includes a concave part recessed in a direction along the first adhered surface.

* * * * *